Feb. 14, 1939.   A. J. SCHOLTES   2,147,353
SPREAD TONGUE HOSE COUPLING
Filed June 4, 1938
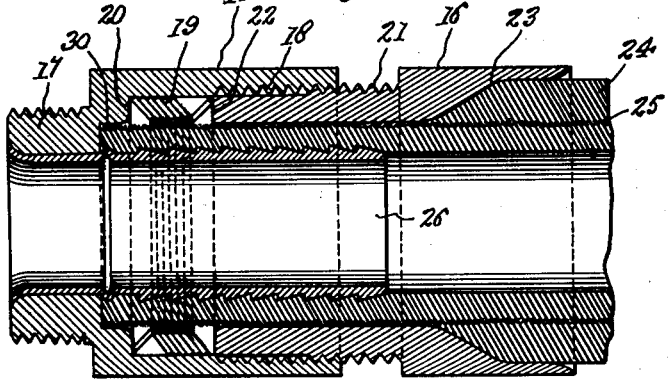
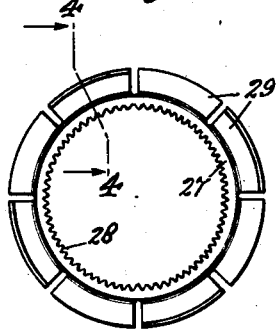
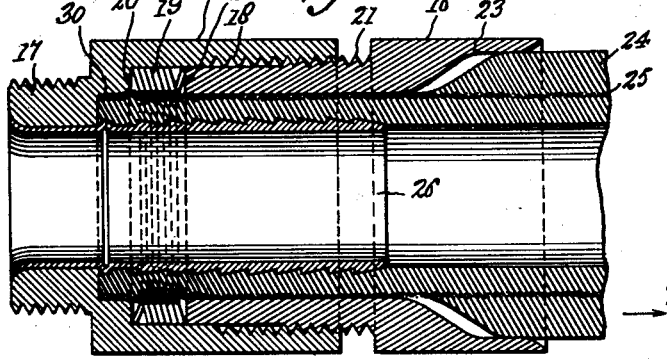
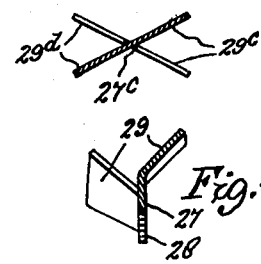
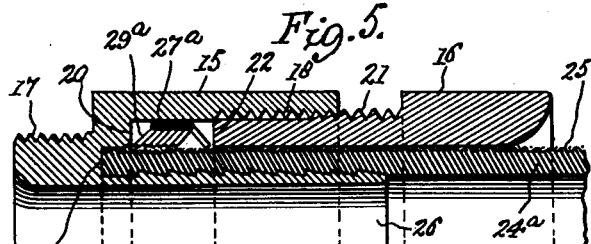
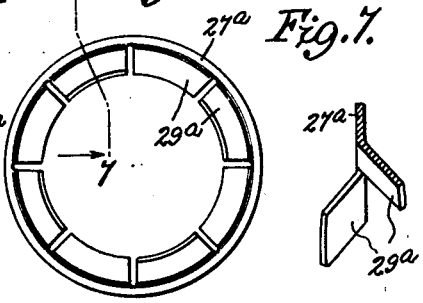
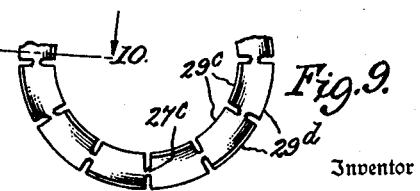
Inventor
Albert J. Scholtes
Mawhinney & Mawhinney
Attorneys Patented Feb. 14, 1939

2,147,353

UNITED STATES PATENT OFFICE 2,147,353

SPREAD TONGUE HOSE COUPLING

Albert J. Scholtes, Baltimore, Md.

Application June 4, 1938, Serial No. 211,923

8 Claims. (Cl. 285—84)

The present invention relates to couplings for hose, pipe, rods and other cylindrical objects to which a coupling may be applied, and has particular reference to a coupling for attachment upon the end of a hose so that a nozzle, another coupling member, or the like, may be attached thereto, and wherein the coupling member is securely locked and sealed upon the end of the hose.

Another object of the present invention is to accomplish the results by a coupling and washer construction, embodying but few parts, wherein great gripping effort is produced, and wherein the hose end is securely gripped and locked in the coupling to prevent possibility of the accidental blowing out of the hose from the coupling incident to any axial pull or internal pressure imposed on the hose and the coupling.

Another object of the invention is to provide an improved construction of washer, which may be used in multiple to occupy the desired space within the coupling, and which is constructed with diverging portions adapted to be compressed toward each other as the coupling is closed on the hose for exerting a radially expanding pressure in the nature of a toggle lever for contracting a portion of the washer against and into the surface of the hose in the coupling and for embedding the edge of the washer therein and obtaining a positive interlock between the coupling and the hose.

A further object of the present invention is to provide a novel construction of washer with a circular row of tongues which are consecutively bent to opposite sides of the washer at diverging angles so that the tongues of the washer may engage within the coupling between the members thereof and be compressed toward the common plane of the washer to radially expand the same so that during the expansion, the outer portion of the washer may be held against the coupling while its inner portion is contracted against and into the surface of the hose.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a longitudinal section taken through a coupling having the improved contracting washer therein, the coupling being mounted on a hose and in position to be secured thereto.

Figure 2 is a similar view with the coupling tightened on the hose to a desired extent, showing the improved contracting washer compressed, contracted and interlocked with the hose.

Figure 3 is a detail enlarged face view of one form of the improved washer, shown in Figures 1 and 2.

Figure 4 is a fragmentary enlarged sectional view taken through one side of the washer substantially on the line 4—4 of Figure 3.

Figure 5 is a fragmentary sectional view taken through the coupling applied to a hose before being contracted and showing a slightly modified form of washer therein.

Figure 6 is a detail enlarged face view of the modified form of washer.

Figure 7 is an enlarged sectional fragmentary view taken through one side thereof on the line 7—7 of Figure 6.

Figure 8 is a fragmentary longitudinal section taken through a modified form of coupling showing therein one assembly of the forms of washers shown in Figures 1 and 5.

Figure 9 is a fragmentary face view of another modified form of the washer, having both inner and outer edge tongues, and Figure 10 is an enlarged transverse section taken through one side thereof on substantially the line 10—10 of Figure 9.

Referring now to the drawing, and first to Figures 1 to 4, any suitable type of coupling may be employed which is adaptable for use with the washer of this invention. In the present illustration the coupling comprises a pair of coupling members 15 and 16. The coupling member 15 is provided with the externally threaded spud 17 on its outer end to receive the nut of a second coupling, of a nozzle, or the like, and the spud 17 is reduced in diameter as compared with the body of the member 15. The member 15 at its inner end has internal threads 18 which terminate in a relatively smooth surface or cylindrical wall 19 within the intermediate portion of the coupling member 15 and which terminates at its reduced juncture with the spud 17 in a shoulder 20 and a hose end receiving recess 30 which face toward the inner open end of the coupling member 15.

The complementary coupling member 16, at its inner end, has external threads 21 at its base portion and has an externally smooth surface portion therebeyond adapted to slide into the cylindrical wall 19 of the member 15; the threads 21 of the member 16 engaging the threads 18 of the outer member 15 in drawing the two members together and contracting the annular space within the cylindrical wall 19 as the coupling members are tightened, or turned up, one upon the other. The inner end of the coupling member 16 terminates in a flat shoulder 22 disposed opposite to the shoulder 20, and these shoulders are adapted to be advanced toward each other as the coupling members are tightened together. The outer end of the coupling member 16 is preferably flared as at 23 to accommodate the end portion of a hose 24. The hose 24 is shown as of the reinforced type having a braided wire reinforcement 25 therein, and the outer layer of the hose 24 is preferably stripped therefrom for substantially the length of the coupling, as shown, to expose the braided wire reinforcement 25 to the interior of the coupling. For supporting the hose in the coupling, the outer member 15 is provided with a nipple 26 which is carried by the spud 17 and extends axially inward therefrom, and preferably slightly beyond the inner end of the coupling member 15 to facilitate the introduction of the hose over the nipple 26 and into the coupling. The exterior surface of the nipple 26 is preferably toothed or corrugated to take into the inner layer or wall of the hose 24 to coact with the coupling in anchoring the hose therein.

For cooperation with the coupling above described, the present invention provides a novel construction of contracting washer. As shown particularly in Figures 3 and 4, the form therein shown provides a washer 27 of substantially ring shape adapted to freely slide over the stripped end of the hose 24, and which may have a serrated or toothed inner edge 28 to interlock with the braiding or wire mesh 25 of the hose. The body part of the washer 27 is provided at its outer marginal edge with a circular row of tongues 29 which are consecutively bent in opposite direction out of the plane of the ring 27, the tongues 29 diverging outwardly from the opposite sides of the ring as shown in the drawing. A plurality of washers of this construction may be closely nested together with their tongues overlapping as the tongues 29 may be of the same length, circumferentially, or at least the washers may be sufficiently alike to interfit, as shown in Figures 1 and 2, to bring the ring portions 27 of the washers into close relation. Thus, a relatively strong coupling may be provided depending upon the pressure to which the coupling is to be subjected, and the nature of the hose, or other object, to which the coupling is applied by merely selecting the desired number of washers.

The nested washers are disposed over the stripped end of the hose 24 within the cylindrical wall 19 of the coupling, and between the shoulders 20 and 22 of the coupling. When the coupling members 15 and 16 are drawn together, by their relative turning, as shown in Figure 2, the tongues 29 of the washers are squeezed together so as to approach the planes of their respective washers 27; with the result that the outer edges of the washers engage against the cylindrical wall 19 and, as the outer edges of the tongues of the washers are radially expanded against the inside wall 19 of the nut, the inner edge portions, or rings 27 in the present instance, are contracted and caused to bind against the bite into the braided reinforcing portion 25 of the hose, as shown in Figure 2; providing a positive interlock between the coupling and the hose. As shown by a comparison of Figures 1 and 2, it will be noted that as the coupling members are tightened or closed together, the hose end 24 is forced or urged toward the outer end of the coupling 15 and into the recess 30 at the inner edge of the shoulder 20 so that the end of the hose may be compressed and sealed effectively in the coupling.

Figure 5 shows the same type of coupling as disclosed in Figures 1 and 2 excepting that the type of hose 24$^a$ is different and the outer layer 25$^a$ is of either rubber or fabric, and wherein a slightly modified form of washer 27$^a$ is used. The modified form of washer is shown in detail in Figures 6 and 7 wherein the ring or body portion 27$^a$ is at the outer edge or periphery of the washer and the tongues 29$^a$ are at the inner edge of the washer. The tongues 29$^a$ are consecutively bent to opposite sides of the plane of the ring or body 27$^a$ of the washer, as shown particularly in Figure 7, so that the diverging edge of the washer is innermost toward the hose instead of being outermost within the coupling as shown in the preferred form. In this form the outer surface rubber of the hose is bulged or pinched outwardly between the tongues 29$^a$ to afford a greater grip on the hose and afford a firm end thrust on the hose in tightening up the coupling.

In operation, the action is similar to that above described in connection with the preferred form: as the shoulders 20 and 22 compress and bend the tongues 29$^a$ toward and into the planes of their respective rings 27$^a$, the latter tend to radially expand against the cylindrical wall 19 with the result that the inner edges of the washers, being the edges of the tongues 29$^a$ in this instance, are caused to contract and bind against and compress into the outer surface portion of the hose 24$^a$ to securely lock the latter in the coupling.

In Figure 8 a modified form of coupling is shown wherein the coupling member 16$^b$ comprises the outer member and the coupling member 15$^b$ is the inner member threaded into the open end of the coupling member 16$^b$. The washers 27 and 27$^a$ are arranged in any suitable manner within the cylindrical wall 19$^b$ of the coupling, such as alternately shown in Figure 8. When the coupling members 15$^b$ and 16$^b$ are closed together the tongues 29 and 29$^a$ of the washers will be bent toward and into the planes of their respective washers 27 and 27$^a$ to radially expand the same and effect a desired interlock between the hose and coupling produced by the combined gripping of the hose by the rings 27 in one instance and the tongues 29$^a$ in the other instance.

It is of course understood that various other modifications or combinations of the washers and tongues may be employed within the spirit of the invention provided that the tongues diverge so that when they are compressed toward each other an increased leverage action will be effected to secure the desired tight gripping and interlocking necessary for a practical and secure coupling.

The washers or rings 27 and 27$^a$ may be continuous as shown, or may be split for easy removal should it be desirable to remove the coupling from the end of the hose.

Another modification of contracting washer is shown in Figures 9 and 10. The body part or ring 27$^c$ has both of its marginal edges slit or slotted to provide inner and outer tongues 29$^c$ and 29$^d$ which, as shown particularly in Figure 10, extend consecutively in opposite directions from the plane of the body ring 27$^c$ to project from the opposite sides of the washer. In any of the forms herein shown the tongues 29 may be merely twisted out of the plane of the washer 27, similar to the illustration of Figure 10, so that the body portion of the washer is composed of the bases of the tongues and the interconnecting twisted portions 27ᶜ of the material joining the tongues. This tends to stabilize the washer and maintain it in the desired transverse relation to the axis of the hose and coupling when the washer is subjected to lateral compression. This double tongue structure of washer may be in multiple in interfitting relation similar to the forms of Figures 1 and 5, and may be used in combination with other forms of washers, such as those shown in Figure 8.

The operation is the same as in the other forms for when the coupling is tightened the tongues 29ᶜ and 29ᵈ are compressed toward and into the plane of the body ring 27ᶜ and radially expand the washer. The cylindrical wall 19 of the coupling resists outward radial expansion and the washer is forced to contract about the hose 24 and secure it in the coupling. In all forms where the diverging tongues engage the surface portion of the hose, the latter is bulged or puckered up between the tongues as the latter are squeezed toward the central plane of the washer to provide a firm grip upon the hose and prevent it from pulling out of the coupling.

One advantage of the oppositely diverging portions of the washer is that the angles of force or pressure are equalized at opposite sides of the washer and the latter is maintained against twisting or deformation out of its general plane, so that the forces of radial expansion are directed inwardly about and against the hose with a toggle lever action, which contracts the metal portion of the washer 27, thereby shrinking the washer about the hose, causing the teeth 28 to bite into the metal braid, or the surface of the hose, according to the type of hose being used.

As the washers are contracted upon the hose by the movement of the part 16, they are also carried forward with the hose, which causes a powerful end thrust upon the end of the hose, and forces it into the pocket 30 and all open spaces between the washers and the abutment will 20.

What is claimed is:

1. In a hose coupling, a pair of coupling members interconnected for relative movement upon the end of a hose and having a cylindrical space therebetween opening against the outer surface of the hose, and an axially compressible washer mounted in said cylindrical space between the coupling members and comprising a flat body portion having a circular row of independent tongues projecting from the marginal edge of the body portion, said tongues being bent consecutively in opposite directions from the plane of the body portion and adapted to be compressed toward and into said plane of the body portion when the coupling members are relatively moved together to contract the inner edge of the washer about and into the surface portion of the hose.

2. In a hose coupling, a pair of relatively movable coupling members having opposed shoulders and a cylindrical wall therebetween providing an annular chamber adapted to open toward the surface of a hose when in the coupling, and an axially compressible washer for engagement about the hose and against said cylindrical wall in said chamber of the coupling and comprising a body portion having marginal edge tongues bent at angles consecutively in opposite directions to project from the opposite sides of the body portion, said washer adapted to be compressed between said opposed shoulders when the coupling members are moved toward each other to compress said tongues toward the plane of the body portion of the washer and radially expand the washer, whereby the force of expansion is reflected inwardly by the cylindrical wall to contract the washer upon the surface portion of the hose.

3. In a hose coupling, a pair of relatively movable coupling members adapted to be fitted over the end of a hose, a washer fitted about the hose end between the coupling members and having an annular portion for engagement with the coupling and having oppositely bent tongues at its inner marginal edge diverging from the annular portion for engagement with the coupling members and adapted to be compressed toward and into the plane of the annular portion for expanding the same in the coupling and forcing the edges of the tongues into the surface portion of the hose.

4. A washer for use in a hose coupling having relatively movable coupling members for engagement about the end of a hose, comprising an annular portion for engagement about the hose within the coupling and having diverging tongues extending from the opposite sides of the annular portion at the outer marginal edge thereof and adapted to engage the coupling members, whereby upon advancement of the coupling members toward each other said tongues are compressed toward and into the plane of the annular portion to contract and bind the same upon the end of the hose.

5. A washer for use in a hose coupling having relatively movable coupling members for engagement about the end of a hose, comprising a body portion for engagement about the hose between the coupling members, said body portion having laterally diverging tongues at its inner and outer edges, said tongues adapted to be compressed toward the plane of the body portion when said coupling members are moved together for radially expanding the washer between the coupling and the hose and securing the latter in the coupling.

6. A washer for use in a hose coupling having relatively movable coupling members for engagement about the end of a hose, comprising a circular body portion for engagement about the hose between the coupling members and having alternate and intermediate portions standing in angular relation to each other, said portions adapted to be compressed toward the plane of the body portion when said coupling members are moved together for radially expanding the washer between the coupling and the hose and securing the latter in the coupling.

7. In a hose coupling, a pair of relatively movable coupling members adapted for engagement over the end of a braid reinforced hose with the outer layer thereof removed to expose the braid reinforcement between the coupling members, and an axially compressible washer for positioning about the exposed braid reinforced portion of the hose and between the coupling members, said washer having teeth at its inner edge for interlocking engagement with said braid reinforcement of the hose, said washer having oppositely and laterally diverging tongues, said tongues adapted to be collapsed toward the plane of the washer when said coupling members are moved toward each other for radially expanding the washer between one of the coupling members and the hose and forcing the washer with its teeth into interlocking engagement with the hose.

8. In a washer for use in a hose coupling having relatively movable coupling members for engagement about the end of a hose, comprising a circular body portion for engagement about the hose between the coupling members and having portions diverging in staggered relation from the opposite sides of the body portion, said portions adapted to be compressed toward the plane of the body portion when said coupling members are moved together for radially expanding the washer between the coupling and the hose and securing the latter in the coupling.

ALBERT J. SCHOLTES.